US010167012B2

(12) United States Patent
Asao et al.

(10) Patent No.: US 10,167,012 B2
(45) Date of Patent: Jan. 1, 2019

(54) ELECTRIC POWER STEERING DEVICE

(71) Applicant: Mitsubishi Electric Corporation, Tokyo (JP)

(72) Inventors: Yoshihito Asao, Tokyo (JP); Akihiko Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/328,125

(22) PCT Filed: Oct. 22, 2014

(86) PCT No.: PCT/JP2014/078054
§ 371 (c)(1),
(2) Date: Jan. 23, 2017

(87) PCT Pub. No.: WO2016/063367
PCT Pub. Date: Apr. 28, 2016

(65) Prior Publication Data
US 2017/0217481 A1   Aug. 3, 2017

(51) Int. Cl.
*B62D 5/04* (2006.01)
*H02P 27/06* (2006.01)
*H02P 29/028* (2016.01)
*H02P 25/22* (2006.01)

(52) U.S. Cl.
CPC .......... *B62D 5/0484* (2013.01); *B62D 5/046* (2013.01); *B62D 5/0487* (2013.01); *H02P 25/22* (2013.01); *H02P 27/06* (2013.01); *H02P 29/028* (2013.01)

(58) Field of Classification Search
CPC ............. B60L 2240/423; Y02T 10/642; B60H 1/004; B60H 1/3222; B60K 1/02
See application file for complete search history.

(56) References Cited

U.S. PATENT DOCUMENTS 6,429,553 B1  8/2002 Taniguchi et al.
2005/0159866 A1  7/2005 Takeuchi et al.
(Continued)

FOREIGN PATENT DOCUMENTS

DE       10157666 A1   6/2003
DE    102013222567 A1   5/2014
(Continued)

OTHER PUBLICATIONS

International Search Report for PCT/JP2014/078054, dated Jan. 27, 2015.
(Continued)

*Primary Examiner* — Shawki S Ismail
*Assistant Examiner* — Zoheb Imtiaz
(74) *Attorney, Agent, or Firm* — Sughrue Mion, PLLC; Richard C. Turner

(57) ABSTRACT

With an object of allowing steering wheel operation to be carried out easily at a normal time and when an abnormality occurs, the invention includes a motor having two windings and a control unit having two control systems that supply control signals to each winding of the motor and when an abnormality occurs in one winding of the motor or in one system inside the control unit, a supply of current to the winding in which the abnormality has occurred is cut to zero, and the motor is driven by a predetermined current necessary at a normal time being supplied to the other winding, while at a time of a normal drive when no abnormality has occurred, the current supply is shared between the two windings, whereby the motor is driven.

10 Claims, 7 Drawing Sheets

(56) References Cited

U.S. PATENT DOCUMENTS

| | | | |
|---|---|---|---|
| 2011/0266984 A1 | 11/2011 | Watanabe et al. | |
| 2011/0315470 A1* | 12/2011 | Uryu | B62D 5/0484 180/446 |
| 2012/0161689 A1 | 6/2012 | Yamasaki | |
| 2013/0320905 A1* | 12/2013 | Uryu | H02K 11/001 318/490 |
| 2014/0009093 A1* | 1/2014 | Suzuki | H02P 21/0096 318/400.02 |
| 2014/0132197 A1 | 5/2014 | Kanazawa et al. | |
| 2014/0326530 A1* | 11/2014 | Asao | B62D 5/0406 180/443 |
| 2015/0061552 A1* | 3/2015 | Mizukami | H02P 23/00 318/400.3 |
| 2015/0084570 A1* | 3/2015 | Hara | B62D 5/0403 318/494 |

FOREIGN PATENT DOCUMENTS

| | | |
|---|---|---|
| EP | 1022210 A1 | 7/2000 |
| EP | 1512609 A1 | 3/2005 |
| JP | 09-107602 A | 4/1997 |
| JP | 2004352242 A | 12/2004 |
| JP | 3839358 B2 | 11/2006 |
| JP | 2011188716 A | 9/2011 |
| JP | 2011-234517 A | 11/2011 |
| JP | 2012143037 A | 7/2012 |
| JP | 2013089104 A | 5/2013 |
| JP | 2014-043122 A | 3/2014 |
| JP | 2014176215 A | 9/2014 |

OTHER PUBLICATIONS

Communication dated Jun. 6, 2017 from the Japanese Patent Office in counterpart Application No. 2016-554994.

Communication dated Apr. 27, 2018 from the Japanese Patent Office in counterpart Patent Registration No. 6223593.

Communication dated May 7, 2018 from the European Patent Office in counterpart application No. 14904274.9.

Communication dated Aug. 3, 2018 issued by the State Intellectual Property Office of People's Republic of China in counterpart application No. 201480082744.0.

* cited by examiner

US 10,167,012 B2

ELECTRIC POWER STEERING DEVICE

CROSS REFERENCE TO RELATED APPLICATIONS

This is a National Stage of International Application No. PCT/JP2014/078054 filed Oct. 22, 2014, the contents of all of which are incorporated herein by reference in their entirety.

TECHNICAL FIELD

The present invention relates in particular to an electric power steering device wherein a motor and a control unit are of a redundant system configuration.

BACKGROUND ART

As an existing electric steering device, there is a device wherein two coil windings are provided in a motor, a control unit having two inverter circuits that can independently drive the two coil windings is included, the two inverter circuits are controlled in concert, and motor drive is continued using only a normally operating inverter circuit when there is an abnormality. Furthermore, in addition to control unit inverter circuits, an electric power steering device that handles a failure as a dual system is also known (Patent Document 1).

CITATION LIST

Patent Literature

Patent Document 1: Japanese Patent No. 3,839,358

SUMMARY OF INVENTION

Technical Problem

The existing electric power steering device disclosed in Patent Document 1 is such that two each of a +B power supply, an input circuit, a CPU, an output circuit, and the like, are configured, and when an abnormality occurs in one, motor control can be continued using the other, normal one. However, simply having two control units and forming a redundant system has a large number of disadvantages in terms of ease of mounting in a vehicle and cost, and it is necessary to configure a redundant system giving consideration to both cost performance and safety.

The invention, having been contrived in order to resolve the problems of the heretofore described kind of existing device, provides an electric power steering device having a redundant system that also gives consideration to ease of mounting, and such that motor control can reliably be continued when there is an abnormality in practically the same way as at a normal time.

Solution to Problem

An electric power steering device according to the invention includes a motor that has a stator including two independent coil windings with respect to a single rotor and causes a vehicle steering mechanism to rotate, and a control unit integrally attached to the motor, wherein the control unit has a power supply circuit that generates a fixed voltage, an input circuit that inputs operation information from various circuits, an output circuit for driving a coil winding of the motor, a power supply relay circuit that cuts off a current supply to the output circuit, and a central processing unit that calculates a control amount based on information from the input circuit and outputs a control signal to the output circuit, and is formed in two systems so as to independently supply or cut off current to each coil winding of the motor, and the central processing unit has an abnormality detection function of detecting an abnormality of the various circuits or coil winding, carries out communication with another central processing unit, and is configured so that when an abnormality is detected in one system, control is continued by the control unit of the other system.

Advantageous Effects of Invention

According to the invention, a steering wheel can be operated in the same way at an abnormal time as at a normal time. Also, by two control units being mounted coaxially with respect to a motor output shaft, an electric power steering device can be reduced in size.

DESCRIPTION OF EMBODIMENTS

First Embodiment

Hereafter, the invention will be described based on FIG. 1 to FIG. 5, which show a first embodiment.

Figure 1:
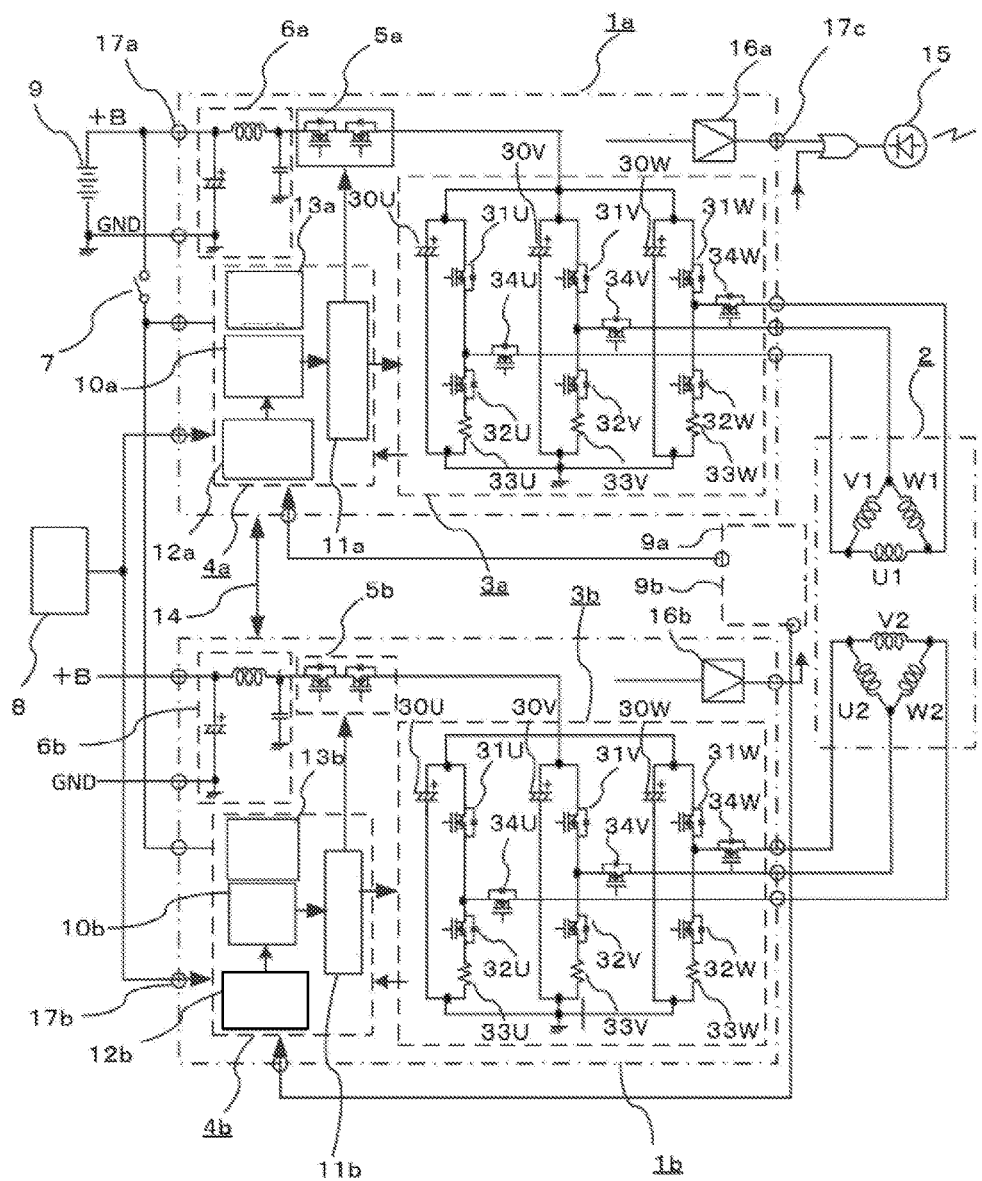
FIG. 1 is a circuit diagram showing a main portion configuration of an electric power steering device according to a first embodiment of the invention.

FIG. 1 is a circuit diagram showing a main portion configuration of an electrical system of an electric power steering device.

In the drawings, control units 1a and 1b control the drive of a motor 2 including two 3-phase coil windings, thereby controlling a steering wheel, and are configured of so-called inverter circuits 3a and 3b, control circuit units 4a and 4b in which are mounted central processing units (hereafter called CPUs) 10a and 10b, power supply relay switching elements 5a and 5b forming a power supply relay circuit, and the like. Also, power is supplied to the control circuit units 4a and 4b from a battery 9 mounted in a vehicle, via an ignition switch 7 and power supply circuits 13a and 13b.

Furthermore, information from, for example, a torque sensor mounted in the vicinity of the steering wheel and detecting steering wheel torque, a speed sensor that detects vehicle cruising speed, and the like, is input into the control circuit units 4a and 4b from a sensor 8. A large number of terminals (17a, 17b, and 17c) for connecting to an external device are provided in the control units 1a and 1b, specifically being disposed by a connector being fixed to a circuit substrate.

Information from the sensor 8 is transmitted to the CPUs 10a and 10b via input circuits 12a and 12b of the control circuit units 4a and 4b. The CPUs 10a and 10b calculate a current value for causing the motor 2 to rotate based on the input information, and output a control signal to drive circuits 11a and 11b. The drive circuits 11a and 11b individually receive an input signal, and output control signals controlling switching elements of the inverter circuits 3a and 3b, which configure output circuits.

As only a small current flows into the drive circuits 11a and 11b, the drive circuits 11a and 11b are disposed in the control circuit units 4a and 4b, but the drive circuits 11a and 11b may equally well be disposed in the inverter circuits 3a and 3b.

Also, the inverter circuits 3a and 3b have the same circuit configuration for each phase of coil winding (U1, V1, W1) and (U2, V2, W2), and are configured so as to supply current to each phase of coil winding independently. Upper and lower arm switching elements (31U, 31V, 31W) and (32U, 32V, 32W) that supply output current to the 3-phase coil windings (U1, V1, W1) and (U2, V2, W2) of the motor 2, motor relay switching elements 34U, 34V, and 34W that connect or disconnect wiring with the coil windings U1, V1, and W1 of the motor 2, current detecting shunt resistors 33U, 33V, and 33W, and noise restricting capacitors 30U, 30V, and 30W, are provided in each of the inverter circuits 3a and 3b.

Also, a potential difference across terminals of the shunt resistors 33U, 33V, and 33W and, for example, voltage of coil winding terminals of the motor 2, and the like, are also input into the input circuits 12a and 12b. Configuration is such that these items of information are also input into the CPUs 10a and 10b, a difference from detected values corresponding to the calculated current value is calculated, and a so-called feedback control is carried out, assisting steering power by supplying a necessary motor current.

Control signals are also output from the power supply relay switching elements 5a and 5b, and the current supply to the motor 2 can be cut off by the power supply relay switching elements 5a and 5b. In the same way, the motor relay switching elements 34U, 34V, and 34W can also independently cut off the current supply to the motor 2.

Herein, in order to restrict an emission of noise due to pulse width modulation of the inverter circuits 3a and 3b, filters 6a and 6b formed of a capacitor and coil are connected to power supply terminals (+B and GND) of the battery 9. Also, as heat is generated by a large current flowing into the power supply relay switching elements 5a and 5b, a configuration may also be such that the power supply relay switching elements 5a and 5b are incorporated in the inverter circuits 3a and 3b respectively, combined with heat dissipating bodies of the inverter circuits 3a and 3b, thereby being caused to dissipate heat.

Herein, the CPUs 10a and 10b include an abnormality detection function of detecting an abnormality in the inverter circuits 3a and 3b, coil windings (U1, V1, W1) and (U2, V2, W2), or the like, from the various kinds of input information, and when an abnormality is detected, the CPUs 10a and 10b cut off the current supply by turning off only a predetermined phase of the motor relay switching element 34 in accordance with the abnormality. Alternatively, the CPUs 10a and 10b can turn off the power supply relay switching elements 5a and 5b, thereby cutting off the battery 9. Furthermore, the CPUs 10a and 10b are configured so as to supply power to an alarm device 15, such as a lamp, via drive circuits 16a and 16b when an abnormality is detected, thereby illuminating the alarm device 15.

Meanwhile, the motor 2 is a brushless motor in which two 3-phase coil windings are delta connected, and in which are mounted rotation sensors 9a and 9b for detecting a rotation position of a rotor. In the case of the rotation sensors 9a and 9b too, two sensors are mounted in order to maintain a redundant system, and rotor rotation information is transmitted to the input circuits 12a and 12b of the control circuit units 4a and 4b respectively. Rather than a 3-phase delta connected brushless motor, the motor 2 may be a star connected brushless motor, or may be two bipolar pairs of brushed motors. Also, the coil winding specification may be a distributed winding or a concentrated winding, as is the case for an existing device. However, it is necessary that only one coil winding, or alternatively both coil windings, are configured so that a desired motor rotation speed and torque can be output.

As heretofore described, each of the control units 1a and 1b is configured so as to be able to independently drive the motor 2 by independently using input information, calculated values, and detected values.

Also, a communication line 14 is connected between the two CPUs 10a and 10b so that data and information can be exchanged. From an exchange of information using the communication line 14, each of the CPUs 10a and 10b can ascertain an operating state of the other. For example, the matter that the CPU 10a has detected an abnormality and turned off a predetermined switching element can be transmitted to the CPU 10b. When an abnormality occurs in the CPU 10a or 10b itself, a regular communication signal using a predetermined format can no longer be exchanged, because of which one CPU can ascertain that an abnormality has occurred in the other CPU.

Figure 2:
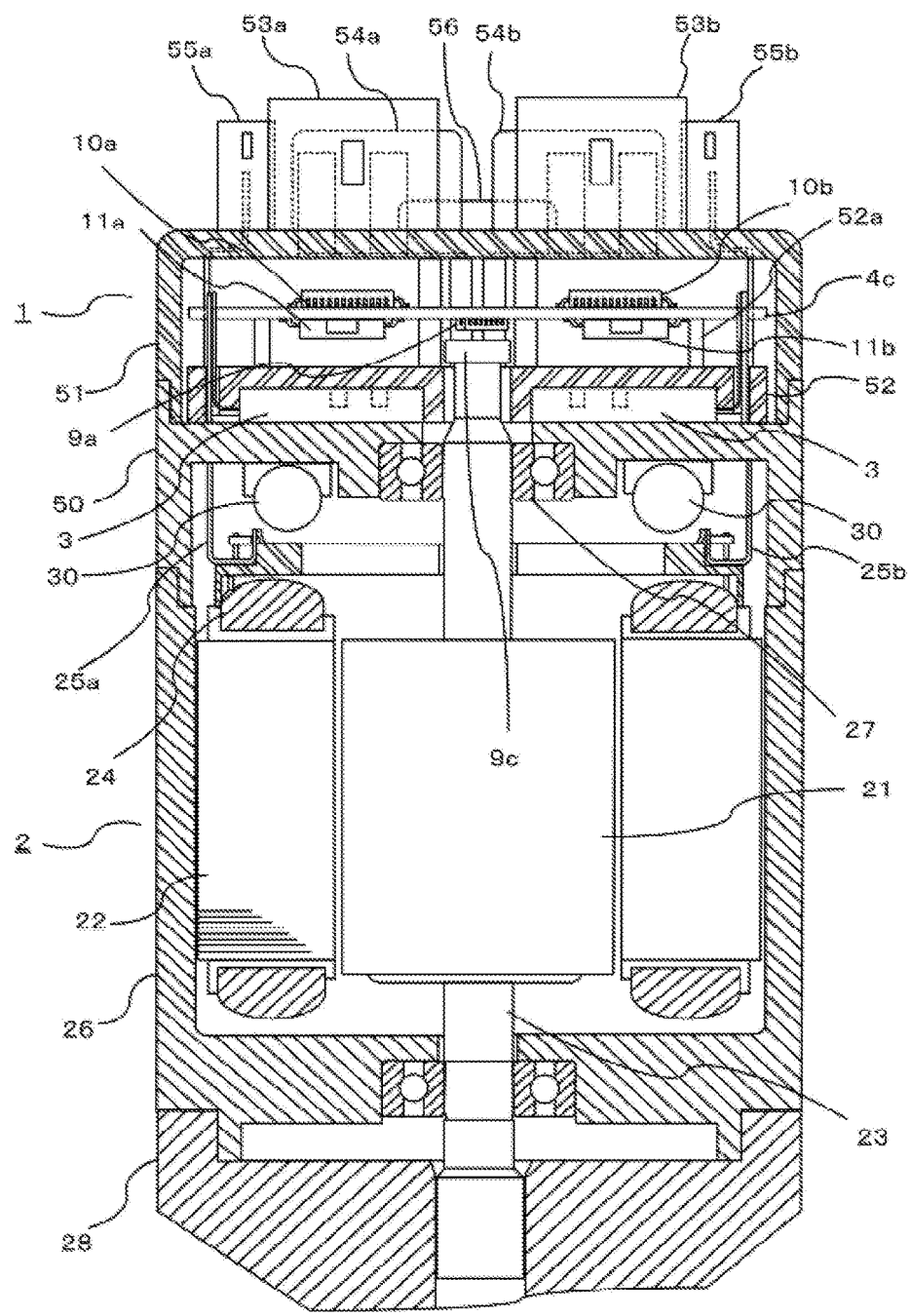
FIG. 2 is a side view showing in section one portion of the main portion configuration of the electric power steering device according to the first embodiment of the invention.

Next, using FIG. 2, a description will be given of an overall structure of an electric power steering device. FIG. 2 shows a structure wherein a control unit 1 including the control units 1a and 1b is mounted on an upper side of the motor 2, and the control unit 1 and motor 2 are integrated.

In the drawing, the motor 2 is configured by a rotor 21, wherein a permanent magnet (not shown) is mounted on a periphery of an output shaft 23, and a stator 22, disposed opposing the rotor 21 and in which is mounted a 3-phase coil winding 24, being mounted inside a cylindrical yoke 26. A decelerator 28 that reduces the rotational speed of the motor 2 is attached to the motor output shaft 23, and output is drawn out from the bottom of the drawing.

Also, three each of extension windings 25a and 25b (only two are shown in the drawing) drawn out from the 3-phase coil winding 24 are extended upward, penetrating an upper frame 50, above the motor 2 (non-output side). The control unit 1 is disposed coaxially above the upper frame 50. The upper frame 50 is fixed to the yoke 26 of the motor 2 by force fitting or the like.

The control unit 1 has a housing 51 made of, for example, insulating resin. A power module 3 formed of the inverter circuits 3a and 3b and the like, which is in close contact with the upper frame 50 and configures an output circuit, is disposed on an inner side of the housing 51, and one portion of leg portions, which are input/output terminals of the inverter circuits 3a and 3b, extends upward and is connected to the extension windings 25a and 25b. Also, an intermediate member 52, and furthermore, a control substrate 4c, are disposed stacked on the upper frame 50. Although a large number of electronic parts configuring the control circuit units 4a and 4b are mounted on the control substrate 4c, only the CPUs 10a and 10b and the drive circuits 11a and 11b are shown. Also, the CPUs 10a and 10b are disposed symmetrically, practically in the center of the control substrate 4c. Furthermore, the drive circuits 11a and 11b are mounted on a bottom surface of the control substrate 4, and the power module 3 configuring the inverter circuits 3a and 3b is disposed opposing the drive circuits 11a and 11b.

Herein, the upper frame 50 is manufactured from, for example, aluminum, which has good thermal conductivity, and is also caused to act as a heatsink by the power module 3 being brought into contact. Although a structure may also be such that a heatsink is built into the power module 3 itself, it is often the case that heat dissipation is insufficient with only a built-in heatsink, and the upper frame 50 having a large area and capacity has superior heat dissipation. Furthermore, the yoke 26 is brought into contact with the upper frame 50, and the yoke 26 can also be caused to carry out an action of dissipating heat of the motor 2 and power module 3. Also, heat dissipation can be improved by the outer peripheries of the upper frame 50 and yoke 26 being exposed to the exterior. The upper frame 50 acts as a partitioning wall for partitioning the control unit 1 and motor 2, and is configured so as to rotatably support the output shaft 23 across a bearing 27.

The intermediate member 52 is attached so as to press the power module 3 downward, bringing the power module 3 into close contact with the upper frame 50. Also, holes that position a large number of input/output terminal portions of the power module 3 and the extension windings 25a and 25b of the motor 2 are provided in the intermediate member 52, and furthermore, a pillar portion 52a for fixing the control substrate 4c at a predetermined interval is provided. Also, power supply (+B, GND) lines are also disposed in the intermediate member 52, and connected to the power module 3.

An output terminal of the power module 3 and an extension winding end of a coil winding of the motor 2 are drawn out as far as an upper surface of the control substrate 4c, and the two are electrically connected by being welded in this portion. Also, the output shaft 23 is provided penetrating in the center of the upper frame 50, and a magnet rotor 9c is mounted on a leading end of the output shaft 23. The rotation sensors 9a and 9b are mounted aligned with the control substrate 4c, opposing the magnet rotor 9c.

A capacitor 30 is also mounted in a space between a lower surface of the upper frame 50 and the motor 2 coil windings, and the capacitor 30 is connected to a power supply terminal of the power module 3 via the intermediate member 52 (not shown).

Consequently, almost all the control unit 1 is disposed above the upper frame 50, but by one portion, such as the capacitor 30, being disposed on the motor 2 side too, effective utilization of space can be achieved.

Figure 3:
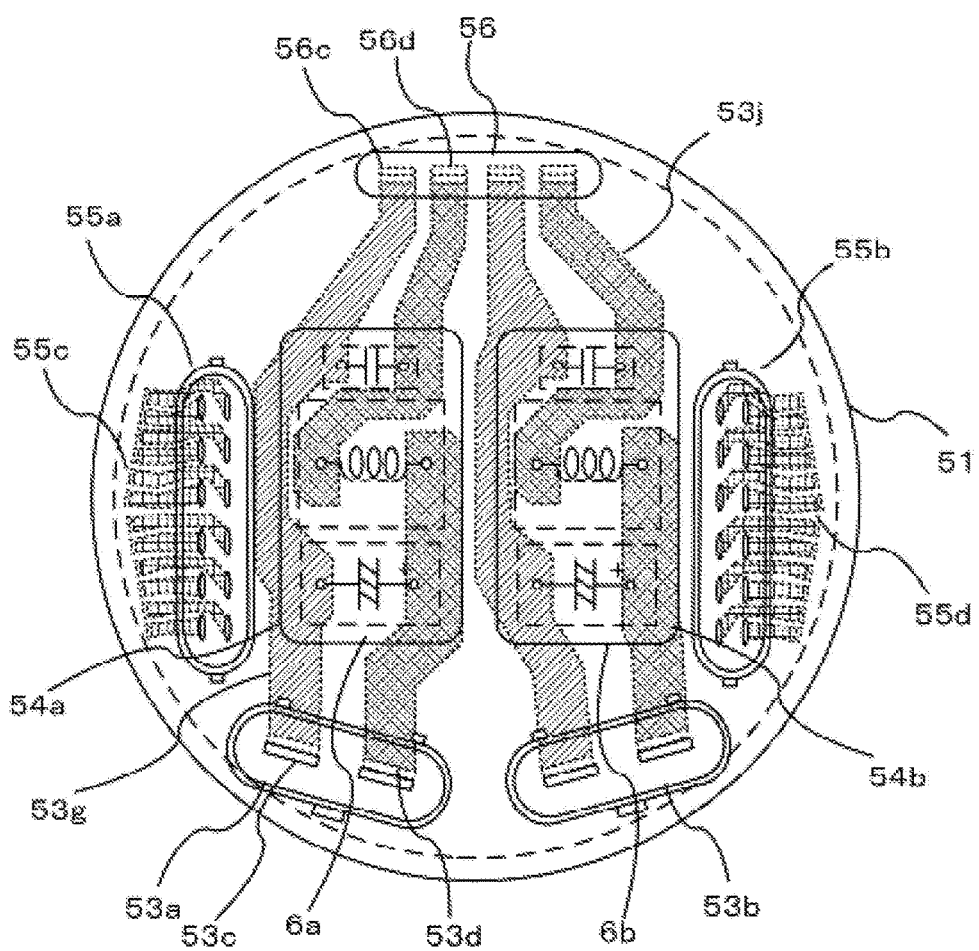
FIG. 3 is a top view showing the main portion configuration of the electric power steering device seen from a control unit side in FIG. 2.

Connectors 53a and 53b for the power supply terminals (+B, GND), covers 54a and 54b in which the filters 6a and 6b are incorporated, and a multiple of connectors such as connectors 55a and 55b for signals of the ignition switch 7, sensor 8, and the like, are disposed on an upper surface of the housing 51. FIG. 3 shows a disposition of these connectors in a state seen from above.

In FIG. 3, two power supply connectors 53a and 53b and two filters 6a and 6b are disposed adjacent. The power supplies (+B, GND) are supplied from terminals 53c and 53d, and connected to the capacitors and coils of the filters 6a and 6b via bus bars 53g and 53j (the bus bars are shown as perspective drawings).

Also, the sensor signal connectors 55a and 55b are disposed on a periphery of the housing 51, and terminals 55c and 55d (perspective drawings) of the connectors 55a and 55b are extended to inside the control unit 1 and combined with the control substrate 4c. Because of this, the terminals 55c and 55d are extended along an inner peripheral surface of the housing 51, and extend to a periphery of the control substrate 4c. Also, as a large number of electronic parts are mounted on the control substrate 4c, the area of the control substrate 4c can be effectively utilized by configuring so that the connection terminals and bus bars are disposed in a peripheral portion of the control substrate 4c, and drawn into the center in accordance with a wiring pattern.

Also, as the filters 6a and 6b are comparatively large parts, the filters 6a and 6b are configured so as to be disposed on the upper surface of the housing 51 and covered with the covers 54a and 54b, rather than being mounted on the control substrate 4c, whereby space can be effectively utilized. Furthermore, two sets of power supply bus bars 56c and 56d that pass through the power supply filters 6a and 6b are disposed in a vicinity of an upper end of the housing 51, extended to inside the control unit 1, and connected to the power module 3 and power supply relay switching elements 5a and 5b. Also, a cover 56, which covers connection portions of the four bus bars 53g and 53j and the four bus bars 56c and 56d extending from the inside of the control unit 1, is provided above the housing 51.

As heretofore described, two sets of connectors are independently disposed practically parallel to each other in the housing 51, and extended with the same aspect through an outer peripheral inner side of the housing 51 to the control unit 1, while maintaining the independence of each portion. Because of this, reduction of the overall area and capacity of the control unit 1 can be achieved.

Figure 4:
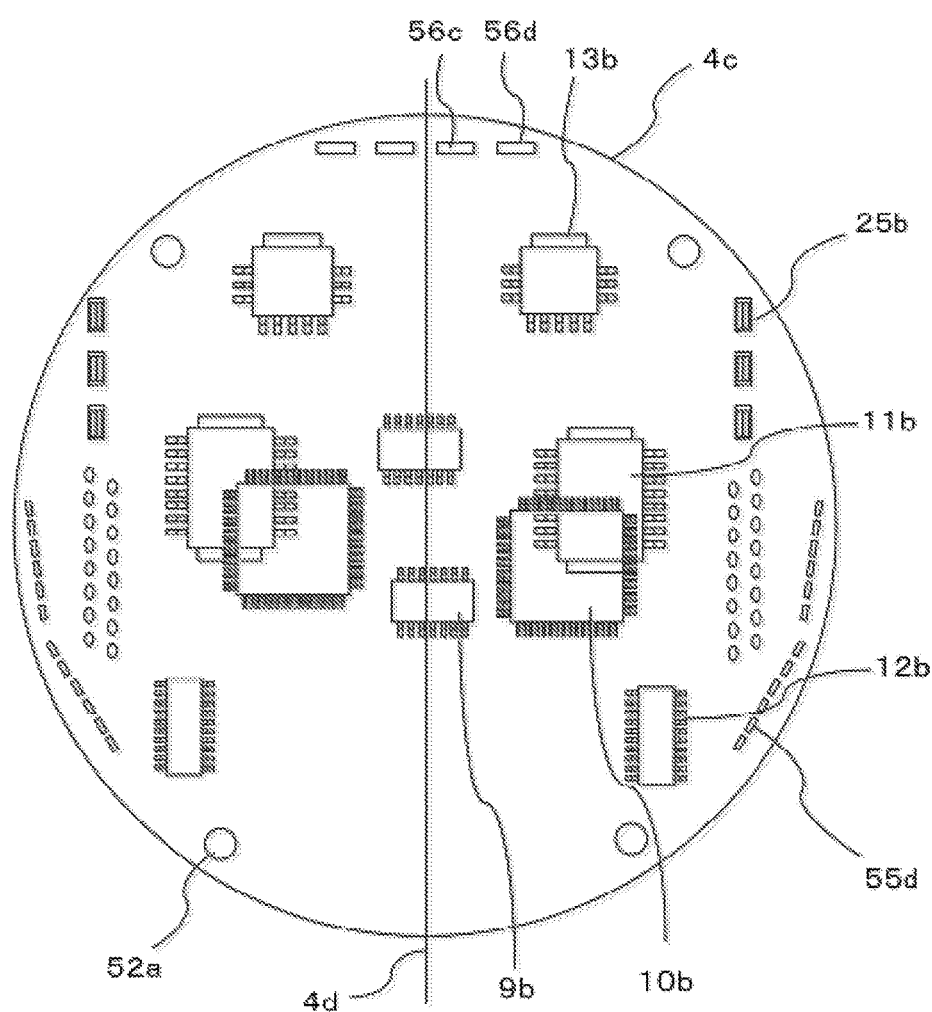
FIG. 4 is a top view showing a control substrate of the electric power steering device in FIG. 2.

FIG. 4 is a top view of the control substrate 4c seen from above, and shows only main electronic parts.

In the drawing, two control circuits are mounted on a single control substrate 4c, with the parts disposed separated to the left and right of a central line 4d. In the drawing, a first system control circuit is mounted on the left side and a second system control circuit on the right side. Herein, to describe the second system control circuit, parts of the power supply circuit 13b are mounted in a vicinity of an upper portion of the control substrate 4c, the CPU 10b is mounted below the parts, and the input circuit 12b is mounted farther below still. The drive circuit 11b and rotation sensor 9b are mounted on a back surface of the control substrate 4c. Three signal connector terminals 55d and extension windings 25b from the motor 2 are disposed in a peripheral portion of the control substrate 4c, and three output terminals of the power module 3 extend so as to come into contact with the above-mentioned three. These terminals are combined by welding, whereby the power module 3 and the coil windings of the motor 2 are electrically connected. Furthermore, four holes for passing the bus bars 56c and 56d of the power supply lines (+B, GND) through are provided in an upper portion of the control substrate 4c.

In this way, the main parts of the two left and right circuit networks are aligned with practically the same distribution, because of which electrical input, arithmetic processing, and output have the same kind of flow in both networks. In this embodiment, there is practically linear symmetry across the central line 4d of the control substrate 4c.

The four round marks on the control substrate 4c are holes for inserting the substrate fixing pillar portions 52a extended from the intermediate member 52. Also, the intermediate member 52 itself is fixed to the upper frame 50. That is, a reduction of space is achieved by forming a stacked structure of the upper frame 50, power module 3, intermediate member 52, and control substrate 4c.

As heretofore described, the two independent control units 1a and 1b are mounted on a single control substrate 4c inside a single housing, whereby control circuits of two systems are provided in parallel. Furthermore, the electrical system is divided perfectly into two independent sets from a connector that is an outermost portion of the device, and a configuration is such that when one control circuit is abnormal, the abnormality can be compensated for with the other control circuit.

As there is normally one vehicle battery 9, the power supply connectors 53a and 53b can be unitary. Also, in the same way, a configuration can be of a disposition and wiring that is unitary as far as the filters 6a and 6b, and perfectly two-system from the electronic circuit portions in the control units 1a and 1b. Also, the CPUs 10a and 10b and the input circuits 12a and 12b are incorporated in the same package, and can perform equivalent functions whether the internal circuits are redundant or independent.

Next, a description will be given of a control operation using the heretofore described circuit configuration and motor structure.

Figure 5:
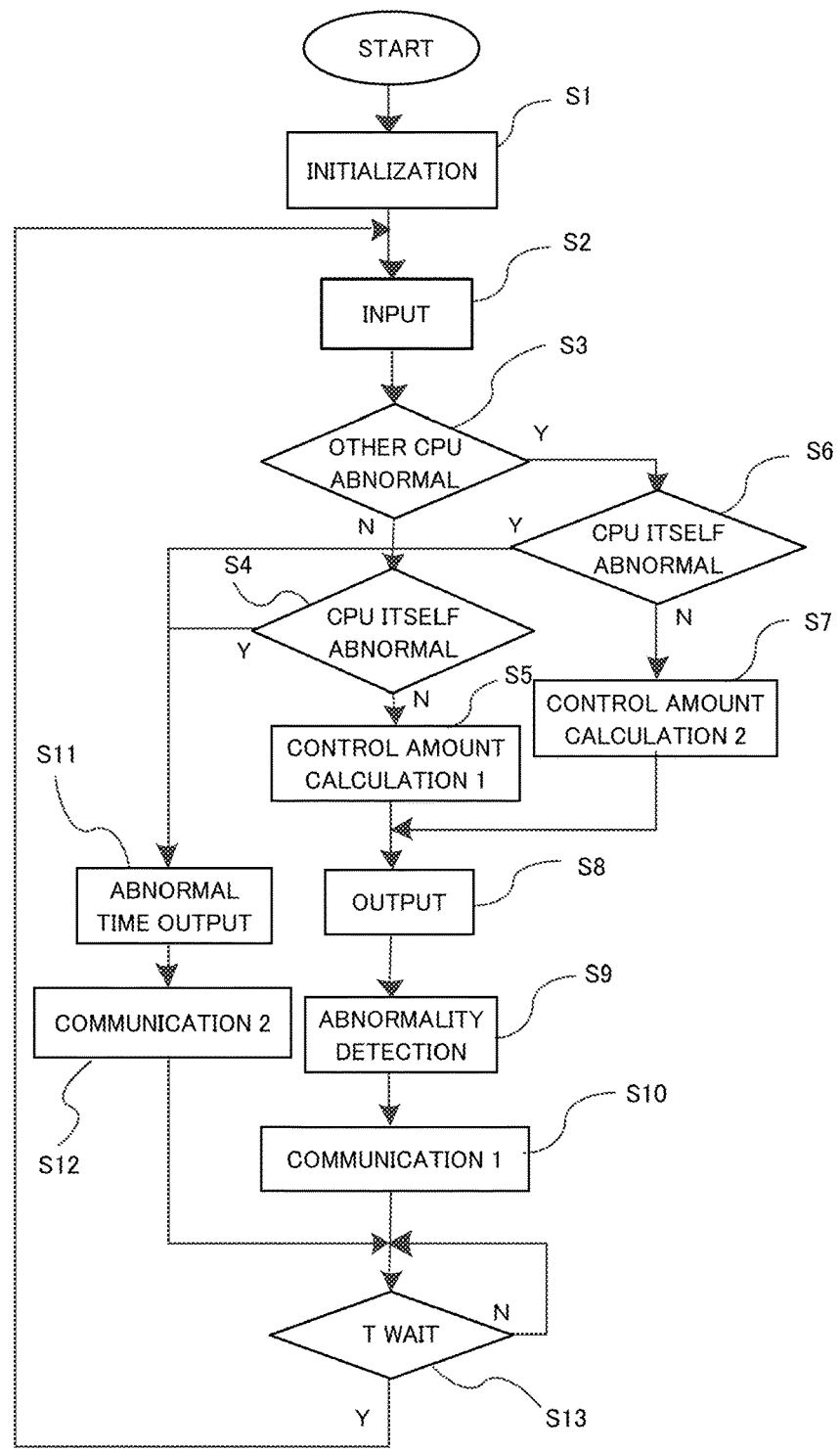
FIG. 5 is a flowchart illustrating an operation of the electric power steering device according to the first embodiment of the invention.

As control of each circuit is almost entirely performed in accordance with a program of the CPU 10, a description will be given based on a flowchart shown in FIG. 5. As the CPUs 10a and 10b carry out practically the same process, the one CPU 10a will be described.

Firstly, when the ignition switch 7 is engaged, current is supplied to the CPU 10a through the power supply circuit 13a, and the process is started.

In step S1, a RAM, a ROM, a port, and the like, are initialized. Next, in step S2, the CPU 10a acquires and stores all kinds of information input via the input circuit 12a. Communication data of the other CPU 10b are also included in this information.

In step S3, the CPU 10a checks for the presence or otherwise of a detected abnormality in the other CPU 10b. The presence or otherwise of an abnormality in the other CPU 10b can be determined by deciphering the communication data of the other CPU 10b. When no abnormality has occurred in the other CPU 10b (N: No), the CPU 10a checks in step S4 for the presence or otherwise of an abnormality in the CPU 10a itself. Herein, when no abnormality is detected (N), the CPU 10a proceeds to step S5, and calculates a normal control amount 1 wherein no abnormality has occurred in either the CPU 10a or 10b.

Meanwhile, when an abnormality has occurred in the other CPU 10b in step S3 (Y: Yes), the CPU 10a proceeds to step S6, and checks for the presence or otherwise of an abnormality in the CPU 10a itself, in the same way as in step S4. Herein, when an abnormality has occurred in the CPU 10a itself (Y), the CPU 10a proceeds to step S11, and carries out a process for when there is an abnormality in the CPU 10a itself. When no abnormality has occurred in the CPU 10a itself (N), the CPU 10a proceeds to step S7, and calculates a control amount 2 under conditions wherein there is an abnormality in the other CPU 10b, and the CPU 10a itself is normal. Subsequently, the CPU 10a proceeds to step S8.

Next, when it is determined in step S4 or step S6 that an abnormality has occurred in the CPU 10a itself, the CPU 10a proceeds to step S11, and outputs a control signal so as to stop output to the drive circuit 11a. Control signals may be categorized into multiple levels based on the abnormality that has occurred. For example, when there is a ground fault or sky fault of a coil winding or of a switching element of the inverter circuits 3a and 3b, the CPU 10a outputs a control signal so as to turn off all the switching elements, including the power supply relay switching element 5a.

Also, when an open failure occurs in one of the upper and lower arm switching elements 31U, 31V, and 31W, or the motor relay switching elements 34U, 34V, and 34W, of the inverter circuits 3a and 3b, the CPU 10a can stop the drive of only the switching element of the phase in which the failure has occurred, and output a control command for the other phases as normal. Because of this, setting can be such that one portion of the control process can be continued in S11, except for a process when there is an abnormality such that everything is in a stopped state. When the previously described kind of 2-phase drive can be carried out, a control amount calculation process is also necessary, because of which it may be that processing in steps S5 and S7 is more efficient.

Next, in step S12, the CPU 10a transmits abnormal state data using the communication line 14. The transmitted data also include an abnormality level; for example, that all switching elements are in an off-state. Also, in a state wherein only a certain phase is turned off, the transmitted data can also include a ratio of the control amount in this case compared with that at a normal time, and the like. Communication of this kind of abnormality detail can also be processed via step S9 and step S10. By so doing, the other CPU 10b can ascertain the abnormality details. Consequently, the CPU 10a can correct and output the control amount of the CPU 10a itself in accordance with an abnormality of the other CPU 10b.

Next, a description will be given of a method of calculating the control amount in step S5 at a normal time wherein no abnormality has occurred in either control unit.

In step S5, a required current value is calculated in accordance with vehicle speed and torque, and divided into halves, in the same way as in an existing device. This halved current value is the control amount allocated to one control unit. Furthermore, the current currently being supplied is detected from the potential difference of the shunt resistor 33, and output as a control command value in accordance with the difference between a target value and the detected value.

Meanwhile, in step S7, as an abnormality has occurred in the other CPU 10b system, it is necessary for the CPU 10a to supply a current value required only by the system of the CPU 10a itself as a control amount calculation 2. Alternatively, when there is an abnormality in only one phase of the other CPU 10b system and two phases are being driven, the CPU 10a calculates so as to supply a two-thirds current value, and outputs a control command value thus calculated. Also, when the other CPU 10b system is in a state wherein the motor cannot be driven at all, the CPU 10a controls so that all calculated control amounts are output in the system of the CPU 10a itself. Furthermore, when an abnormality has occurred in only one phase, as previously described, a 2-phase drive control amount can be calculated in step S5 or step S7. That is, the control amount can be obtained by calculating using practically the same procedure as at a normal time, and lastly correcting to a 2-phase drive control amount.

Furthermore, the same procedure can be executed in the two CPUs 10a and 10b simply by changing only a distribution rate, whereby a simplification of control logic can be achieved.

Next, in step S8, the CPU 10a outputs a control command so that the switching elements can be driven based on a control command value. As the upper and lower switching elements of the inverter circuits 3a and 3b are pulse width modulated, the CPU 10a outputs a control signal in accordance therewith.

In step S9, the CPU 10a checks for the presence or otherwise of an abnormality. Specifically, an abnormality can be detected using a method whereby current flowing to drive each switching element is detected in the shunt resistor 33, and by monitoring motor coil winding terminal voltage and distinguishing that a predetermined voltage appears in accordance with switching element drive.

Furthermore, when a discrepancy in a detected current value with respect to a target current value does not decrease even after a predetermined time elapses, there is a possibility of a leakage, because of which the CPU 10a can be caused to determine that there is an abnormality.

By monitoring the voltage and current of each portion to detect an abnormality, as heretofore described, the CPU 10a can detect even an abnormality in only one phase.

When detecting this kind of abnormality, the CPU 10a stores information including the abnormal state, and communicates the abnormal state via the communication line 14 to the other CPU 10b in step S10. When there is other necessary information, it is efficient when transmission of the other information is included in this process. For example, the accuracy of each other's control amount calculation can be checked by exchanging input circuit 12a information and control amount information.

Next, in step S13, the CPU 10a waits until a predetermined time, for example 5 seconds, elapses, and when the predetermined time elapses (Y), the CPU 10a returns to step S2 and advances the process again using the same procedure.

The heretofore described kind of CPU 10a processing operation is also executed in the same way by the CPU 10b, thereby forming a parallel redundant system.

Consequently, each control unit is allocated one-half of control of the motor 2 in a normal state wherein there is no abnormality, but when an abnormality occurs in one CPU, the normal CPU can continue 100% of the control even in a worst case, and there is no occurrence of a situation in which a driver's steering becomes difficult. Also, as the CPU 10a can include a function of notifying of an abnormality not only in the system of the CPU 10a itself but also in the other CPU 10b system, notification to the driver when an abnormality occurs is reliable, and the driver can also be informed of which side of the motor 2 is abnormal. This notification can be realized by causing the alarm device 15 to operate in step S10 or step S12, based on an output when there is an abnormality in step S9 or step S11.

Also, even at a normal time when no abnormality has occurred, an uneven control such as one-third to two-thirds can be carried out when, for example, the temperature of one control unit is higher than that of the other. This kind of situation is enabled by one control unit transmitting information requesting help from the other control unit via the communication line 14, thereby informing the other control unit. Also, when the control unit itself is also exposed to a high temperature, both control units are in a high load state, because of which the control units can prevent an occurrence of a failure by mutually reducing a target value. Furthermore, although a control amount assignation ratio can theoretically be changed in any way, the ratio having only two or three stages is advantageous in simplifying control specifications and simplifying the CPU program, and furthermore, in terms of responding when there is an abnormality in the CPU itself. For example, there can be three stages of level, with the normal side being 50%, 65%, or 100%, and the abnormal side being 50%, 35%, or 0%.

In the heretofore described embodiment, communication 1 and communication 2 of steps S10 and S12 are provided independently in two places, but as the output systems are provided independently taking the matter that an abnormality has occurred into consideration, communication 1 and communication 2 may be combined in one place. Also, although the abnormality detection means of step S9 is disposed after the output step S8, the abnormality detection means may be provided, for example, between step S2 and step S3.

Taking into consideration a case wherein, in particular, the switching elements in the control units 1a and 1b are 100% driven, it is necessary that heat dissipation thereof is sufficiently maintained. Specifically, it is necessary to design taking a current capacity of an element itself, and a heat dissipating heatsink structure, into consideration. Also, with regard to the motor 2, it is necessary to design coil and magnet specifications, and the scale of each part, in order that a desired maximum torque with respect to rotation speed can be output with only one 3-phase coil winding.

Furthermore, heat dissipation can be improved by separating the control substrate 4c and power module 3, disposing the power module 3, which has the greatest heat generation, distanced from the control substrate 4c.

Also, the structure is such that a heatsink is provided in the power module 3, the heatsink is brought into close contact with another heat sink (the upper frame 50) with a large heat dissipation area and capacity, and brought into contact with the yoke 26, whereby heat of the power module is conducted as far as the yoke 26. Because of this, the yoke 26 is also made of aluminum, which has good heat dissipation, whereby heat dissipation of the motor 2 itself can also be improved.

Also, when one control unit is abnormal, the whole of the heat sink can be used with only one system because the heatsink (upper frame 50) is unitary, whereby heat dissipation can be improved. Also, owing to the unitary heatsink (upper frame 50), heat bias can be eliminated and an even heat distribution formed, and furthermore, exposing an outer periphery of the heatsink as an outermost layer of the device can contribute to a further improvement in heat dissipation.

Second Embodiment

Next, using FIG. 6 to FIG. 8, a second embodiment of the invention will be described.

Figure 6:
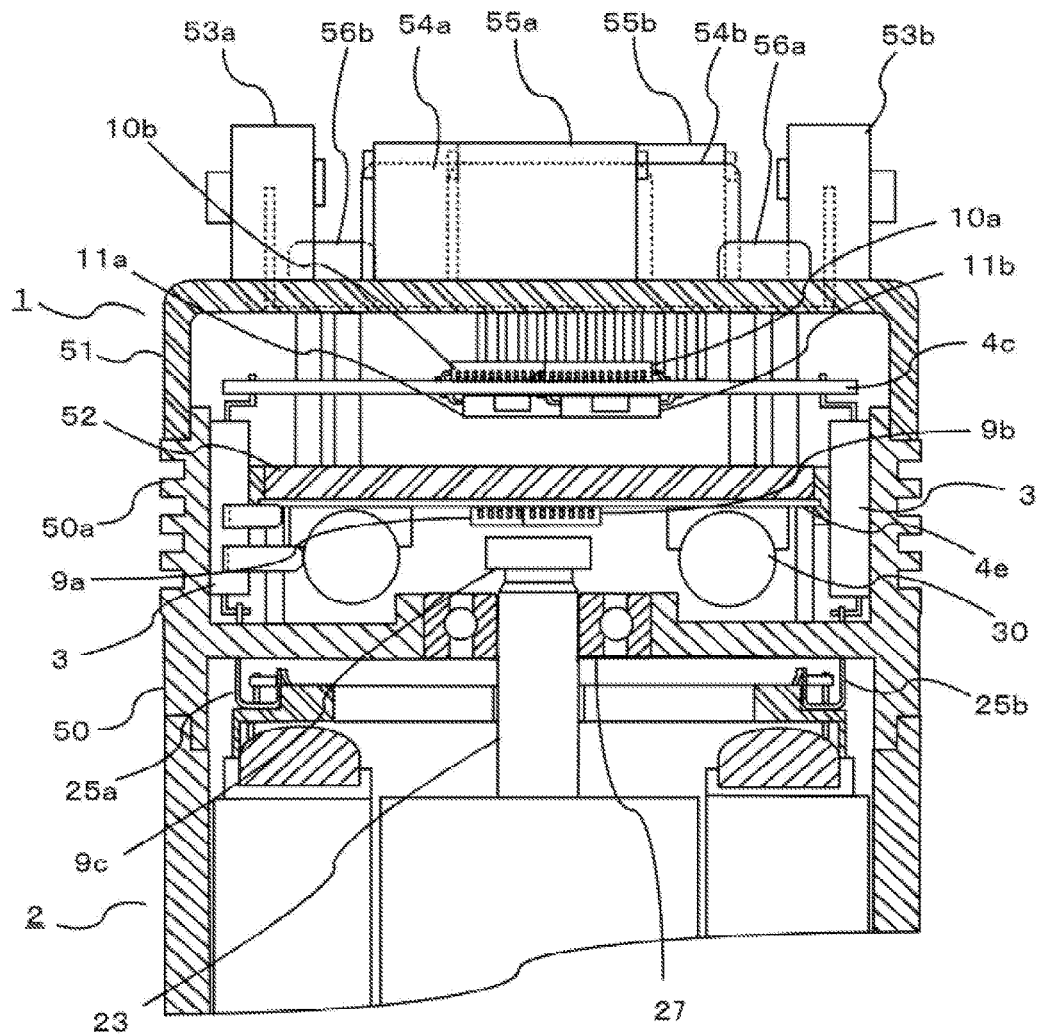
FIG. 6 is a side view showing in section one portion of a main portion configuration of an electric power steering device according to a second embodiment of the invention.

FIG. 6 is a drawing corresponding to FIG. 2 of the first embodiment, wherein identical reference signs indicate identical or corresponding portions. Also, an overall circuit diagram is equivalent to FIG. 1.

FIG. 6 shows a state wherein a pair of power modules 3 are disposed parallel to the output shaft 23. As the motor 2 is the same as in FIG. 2, a description thereof will be omitted. The magnet rotor 9c is mounted for a rotation sensor on an end portion on a non-output side of the output shaft 23 of the motor 2, and is rotated synchronously with the output shaft 23. Also, the upper frame 50 is of a practically cylindrical form, in which is formed a bottom portion that segregates the control unit 1 and motor 2.

The bearing 27 that rotatably supports the output shaft 23 is mounted in the center of the bottom portion. Furthermore, the upper frame 50 has an irregular wall portion 50a in one portion of an outer periphery of the cylindrical portion, whereby surface area is expanded and heat dissipation is improved. The two power modules 3 are brought into contact with an inner side of the wall portion, thereby improving the heat conductivity of the power modules 3. The two power modules 3 are disposed vertically on side walls of the upper frame 50, unlike the horizontal disposition of FIG. 2. Also, a sensor substrate 4e is mounted together with the intermediate member 52 between the two power modules 3.

The two rotation sensors 9a and 9b for detecting rotation of a permanent magnet mounted in the magnet rotor 9c are mounted in a central portion of the sensor substrate 4e, and rotation information is transmitted independently from the rotation sensors 9a and 9b to the CPUs 10a and 10b respectively. Also, the intermediate member 52 is provided with lines of a power supply, ground, and the like, and performs an action of a kind of crossbeam that causes each of the power modules 3 to come into contact with the wall portion 50a.

The power module 3 has a practically cuboid package, a coil winding terminal is disposed on a lower surface of the package, and control terminals that drive switching elements of the power module 3, and a multiple of signal terminals of a voltage monitor of each terminal, a shunt resistor voltage monitor, and the like, are mounted on an upper surface. Power supply and ground terminals are disposed on a side surface of the package.

The control substrate 4c is mounted on an upper side of the intermediate member 52, and a large number of electronic parts, such as the CPUs 10a and 10b, power supply circuits 13a and 13b, input circuits 12a and 12b, and drive circuits 11a and 11b, are mounted on the substrate. Furthermore, the control substrate 4c is covered by the housing 51 in order to protect a periphery of the control substrate 4c. Consequently, the control unit 1 is enclosed by the housing 51 and one portion of the upper frame 50.

Owing to the heretofore described configuration, the upper frame 50 performs a multiple of actions, those being a heatsink for the power module 3, support of the bearing 27, a partitioning wall between the control unit 1 and motor 2, and one portion of a housing of the control unit 1.

Figure 7:
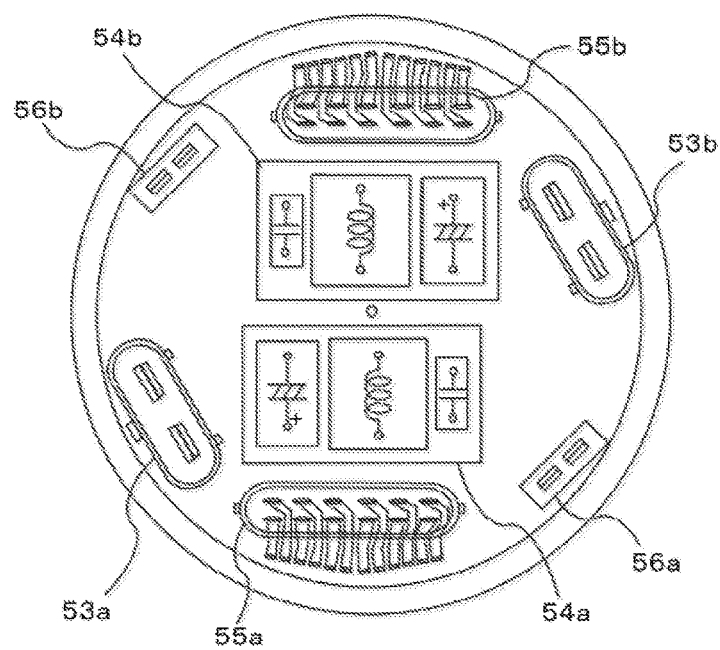
FIG. 7 is a top view showing the main portion configuration of the electric power steering device seen from a control unit side in FIG. 6.

Also, connectors are mounted on the upper surface of the housing 51, and an outline configuration thereof is shown in FIG. 7.

In FIG. 7, the power supply connector 53a, signal connector 55a, filter cover 54a, and a power supply cover 56a are disposed on a bottom side in the drawing. Meanwhile, another system is such that connectors are disposed with practically point symmetry with respect to a central point of the housing 51. That is, a first system is such that a flow of electricity is formed from the left side in the drawing of the power supply connector toward the right side, and a second system is such that a flow of electricity is formed from the right side in the drawing toward the left side.

Figure 8:
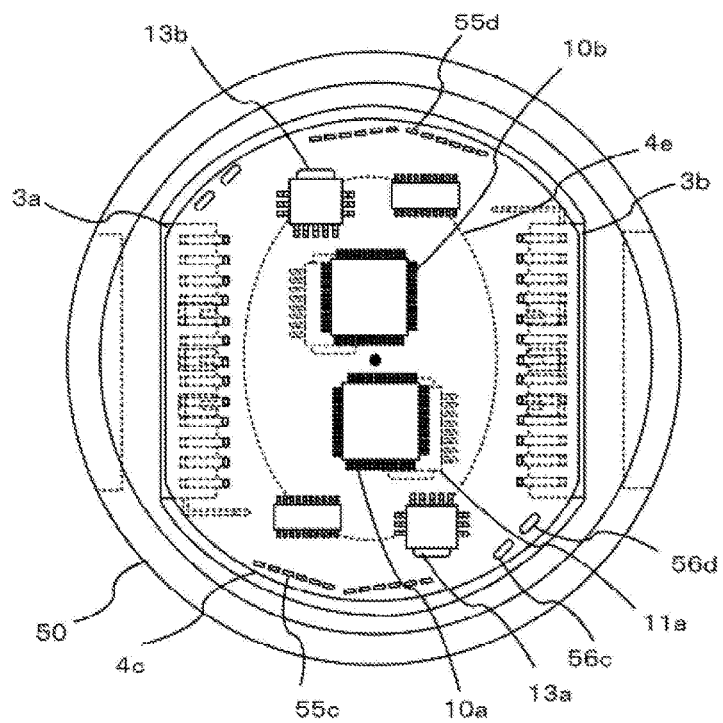
FIG. 8 is a top view showing a control substrate of the electric power steering device in FIG. 6.

Next, FIG. 8 shows an outline configuration of a state wherein the housing 51 has been removed.

In the drawing, the control substrate 4c is disposed in an uppermost stage on an inner peripheral side of the outer peripheral upper frame 50, and the power modules 3 are disposed on either side in the drawing on the lower side of the control substrate 4c. Also, the sensor substrate 4e is disposed between the power modules 3 on a back surface side of the control substrate 4c. Electrical parts are also disposed in positions of point symmetry with respect to a central point on the control substrate 4c (the intermediate member 52 is not shown in the drawing).

By being disposed with point symmetry with respect to the central point of the control substrate 4c in this way, the power supply circuits 13a and 13b are disposed in positions distanced from each other. When the power supply circuits 13a and 13b have, for example, a fixed power supply of 5V, there is an advantage in that as the power supply circuits 13a and 13b are in positions distanced from each other, heat dissipation improves. Also, places on an input circuit periphery and drive circuit periphery in which wiring is massed are also distanced, because of which an increase in substrate area efficiency can be achieved. Furthermore, arrays of the signal connector terminals 55c and 55d are also disposed with point symmetry with respect to the central point, whereby a wiring operation can be carried out smoothly.

Also, by connection of a coil winding with an extension winding end in the power module 3 being of a press fit structure wherein one terminal is force fitted into a depressed portion or hole of another terminal, a connection operation can be efficiently carried out. Furthermore, the control terminals and signal terminals are connected by direct soldering to the control substrate 4c.

The power supply and ground terminals are disposed on side surfaces of the power module 3, and connected to terminals extended from the intermediate member 52 (not shown), because of which the sensor substrate 4e and intermediate member 52 are mounted after the power module 3 is disposed in the upper frame 50, and the control substrate 4c is disposed last. When disposing the control substrate 4c, the control and signal terminals of the power module 3 are inserted into holes in the control substrate 4c.

As heretofore described, a device wherein a control unit and motor are integrated is such that when configuring a control unit side parallel redundant system, a housing and control substrate enclosed therein are unitary in order to achieve, in particular, a reduction in size. Furthermore, by electrical parts mounted on the control substrate being disposed in two sets with point symmetry or linear symmetry along a flow of electricity, an effective utilization of substrate area can be achieved. Also, by two inverter circuits, which are output circuits, being provided in parallel aligned with motor coil winding ends, and disposed in a vicinity of the motor coil windings, a reduction in size, and a reduction in distance from a connection between a motor coil winding end and an inverter circuit terminal, can be achieved. Furthermore, by a heatsink with a large area and capacity being brought into close contact with the inverter circuit, and the heatsink being brought into contact with a yoke of the motor, size can be reduced, and heat dissipation of the inverter circuit can be improved.

The embodiments of the invention can be modified or abbreviated as appropriate, without departing from the scope of the invention.

REFERENCE SIGNS LIST 1, 1a, 1b: Control unit, 2: Motor, 3: Power module (output circuit), 3a, 3b: Inverter circuit, 4a, 4b: Control circuit unit, 4c: Control substrate, 6a, 6b: Filter, 5a, 5b: Power supply relay switching element (power supply relay circuit), 8: Sensor, 9: Battery, 9a, 9b: Rotation sensor, 10a, 10b: Central processing unit (CPU), 11a, 11b: Drive circuit, 12a, 12b: Input circuit, 13a, 13b: Power supply circuit, 14: Communication line, 15: Alarm device, 21: Rotor, 22: Stator, 23: Output shaft, 24: Winding, 50: Upper frame, 51: Housing, 52: Intermediate member, 53a, 53b: Signal connector, 55a, 55b: Power supply connector.

The invention claimed is:

1. An electric power steering device, comprising:
a motor that has a stator including two independent coil windings with respect to a single rotor and causes a vehicle steering mechanism to rotate; and
a first control unit and a second control unit that are integrally connected to the motor,
wherein each of the first control unit and the second control circuit comprises:
a power supply circuit that generates a fixed voltage;
an input circuit that inputs operation information from a plurality of circuits;
a central processing unit that calculates a control amount based on information from the input circuit, detects an abnormality of the plurality of circuits or the coil windings, and performs communication with the other central processing unit;
an inverter circuit that controls power supply to the motor based on the control signal; and
a drive circuit that transmits the control signal of the central processing unit to the inverter circuit;
when the abnormality is detected in one of the first control unit and the second control unit, control of the motor is continued by the other control unit, and
wherein a first set of the central processing unit and the driver circuit of the first control unit and a second set of the central processing unit and the driver circuit of the second control unit are disposed in parallel to each other on a same substrate that is spaced apart from the inverter circuit of the first control unit and the inverter circuit of the second control unit.

2. The electric power steering device according to claim 1, wherein the first control unit and the second control unit are disposed inside a single housing.

3. The electric power steering device according to claim 2, wherein the inverter circuit of the first control unit is connected in parallel to the inverter circuit of the second control unit.

4. The electric power steering device according to claim 2, wherein a first connector and a second connector are disposed in the first control unit and the second control unit, respectively, as power supply terminals.

5. The electric power steering device according to claim 3, wherein a first connector and a second connector are disposed in the first control unit and the second control unit, respectively, as power supply terminals.

6. The electric power steering device according to claim 3, further comprising a heatsink that is in contact with the inverter and a yoke that houses the motor, and partitions the first control unit and the second control unit from the motor.

7. The electric power steering device according to claim 3, comprising a heatsink that is in contact with the inverter and a yoke that houses the motor,
wherein at least one portion of an outer periphery of the heatsink is exposed, and the inverter circuit is mounted on an inner side of the exposed portion.

8. The electric power steering device according to claim 3, wherein the inverter circuit of each of the first control unit and the second control unit is controlled so as to supply 50% of a current that is required for the motor when both of the first control unit and the second control unit are normal and
when one of the inverter of the first control unit and the inverter of the second control unit is abnormal, the other inverter supplies 100% of the current that is required for the motor.

9. The electric power steering device according to claim 3, wherein the central processing unit detects an abnormality of the central processing unit itself and the other central processing unit, and when determining that the central processing unit itself is normal while the other central processing unit is abnormal, the central processing unit sets a control command of the central processing unit itself to control an entire system of the electric power steering device, and notifies that the other central processing unit is abnormal.

10. The electric power steering device according to claim 9, wherein the central processing unit includes an alarm device that notifies of the abnormality of the central processing unit itself or the other central processing unit.

* * * * *